(12) United States Patent
Czezatke et al.

(10) Patent No.: US 10,275,308 B2
(45) Date of Patent: Apr. 30, 2019

(54) DETECTING AND CORRECTING SILENT DATA CORRUPTION IN A DISTRIBUTED STORAGE SYSTEM

(71) Applicant: Maxta, Inc., Sunnyvale, CA (US)

(72) Inventors: Christian Czezatke, San Francisco, CA (US); Raghu Shastry, San Jose, CA (US)

(73) Assignee: Maxta, Inc., Santa Clara, CA (US)

( * ) Notice: Subject to any disclaimer, the term of this patent is extended or adjusted under 35 U.S.C. 154(b) by 267 days.

(21) Appl. No.: 15/052,732

(22) Filed: Feb. 24, 2016

(65) Prior Publication Data

US 2017/0242751 A1     Aug. 24, 2017

(51) Int. Cl.
  G06F 17/30   (2006.01)
  G06F 11/10   (2006.01)
  G06F 11/14   (2006.01)
  G06F 3/06    (2006.01)

(52) U.S. Cl.
  CPC .......... G06F 11/1076 (2013.01); G06F 3/065 (2013.01); G06F 3/067 (2013.01); G06F 3/0619 (2013.01); G06F 11/1451 (2013.01); G06F 2201/805 (2013.01); G06F 2201/84 (2013.01)

(58) Field of Classification Search
  CPC .................................................. G06F 11/1076
  See application file for complete search history.

(56) References Cited

U.S. PATENT DOCUMENTS

2010/0332446 A1* 12/2010 Ahrens ............. G06F 17/30067
                                                       707/609
2015/0127618 A1*  5/2015 Alberti ............. G06F 17/30088
                                                       707/678

\* cited by examiner

Primary Examiner — Syed H Hasan
(74) Attorney, Agent, or Firm — Fenwick & West LLP

(57) ABSTRACT

A file and a sequence of snapshots of the file are stored in a storage device. The sequence of snapshots includes sequentially captured copies of earlier states of the file. A dependency tree indicating data blocks that are different between a given snapshot and a previous snapshot in the sequence of snapshots is stored in the storage device. The sequence of snapshots is sequentially scrubbed, beginning with an earliest snapshot in the sequence of snapshots. When scrubbing a snapshot, each of the data blocks identified in the dependency tree as being different than the data blocks of a previous snapshot in the sequence of snapshots are scrubbed. If a corrupted data block is detected, a determination of which later snapshots include the corrupt data block is made based on the dependency tree and the corrupted data blocks are corrected.

20 Claims, 6 Drawing Sheets

DETECTING AND CORRECTING SILENT DATA CORRUPTION IN A DISTRIBUTED STORAGE SYSTEM

BACKGROUND

Technical Field

The present invention relates to data storage and, more specifically, to detection and correction of corrupt data in a distributed storage system.

Description of the Related Art

Data stored in a storage device may become corrupted over time. For instance, a bit might be flipped (e.g., a data bit may change from a 0 to a 1, or vice versa). For example, in a solid-state storage device, electrical charges may slowly leak away due to an imperfection in the insulator. In a magnetic storage device, bits storing data may gradually lose their magnetic orientation. These events may be random in nature, and the frequency of occurrences may depend on the type of storage device (e.g., magnetic, solid state), the age of the storage device, the workload of the storage device, etc.

To reduce the amount of corrupted data in a storage system, data may be scrubbed periodically. That is, the data stored in the storage system may be read and a determination may be made whether or not the data contains an error. Additionally, the data may be corrected, if possible. For instance, data may be replaced by a copy of the same data stored in a different location, or a data correction algorithm, for example, by using an error-correction code, may be used to recover the corrupted data.

One way to scrub the data stored in a storage system is to indiscriminately scrub all available physical locations in the storage system. This process is inefficient since physical locations that do not store useful data are unnecessarily scrubbed.

Another way to scrub the data stored in a storage system is traverse through all the files stored in the storage system, and scrub the data associated with each of the files. In a copy-on-write storage systems, where when a copy of a file is made, the original data is not duplicated until a write operation is performed to the data of either the original file or the copy, data blocks may be shared by multiple files. If the data of every file stored in the storage system is scrubbed, some data, associated with multiple files, may be scrubbed multiple times. Thus, conventional techniques for detecting corrupt data in file-based storage systems are also inefficient.

SUMMARY

A computer-implemented method enables detecting and/or correcting errors in a distributed data storage system.

In one embodiment, a file and a sequence of snapshots of the file are stored in a storage device. The sequence of snapshots includes sequentially captured copies of earlier states of the file. A dependency tree indicating data blocks that are different between a given snapshot and a previous snapshot in the sequence of snapshots is stored in the storage device. The sequence of snapshots is sequentially scrubbed, beginning with an earliest snapshot in the sequence of snapshots. When scrubbing a snapshot, each of the data blocks identified in the dependency tree as being different than the data blocks of a previous snapshot in the sequence of snapshots are scrubbed. If a corrupted data block is detected, a determination of which later snapshots include the corrupt data block is made based on the dependency tree and the corrupted data blocks are corrected.

In other embodiments, a non-transitory computer readable storage medium stores instructions that when executed by one or more processors carries out the methods described above. In yet further embodiments, a computing system is configured to perform one or more the methods described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION

Figure 1:
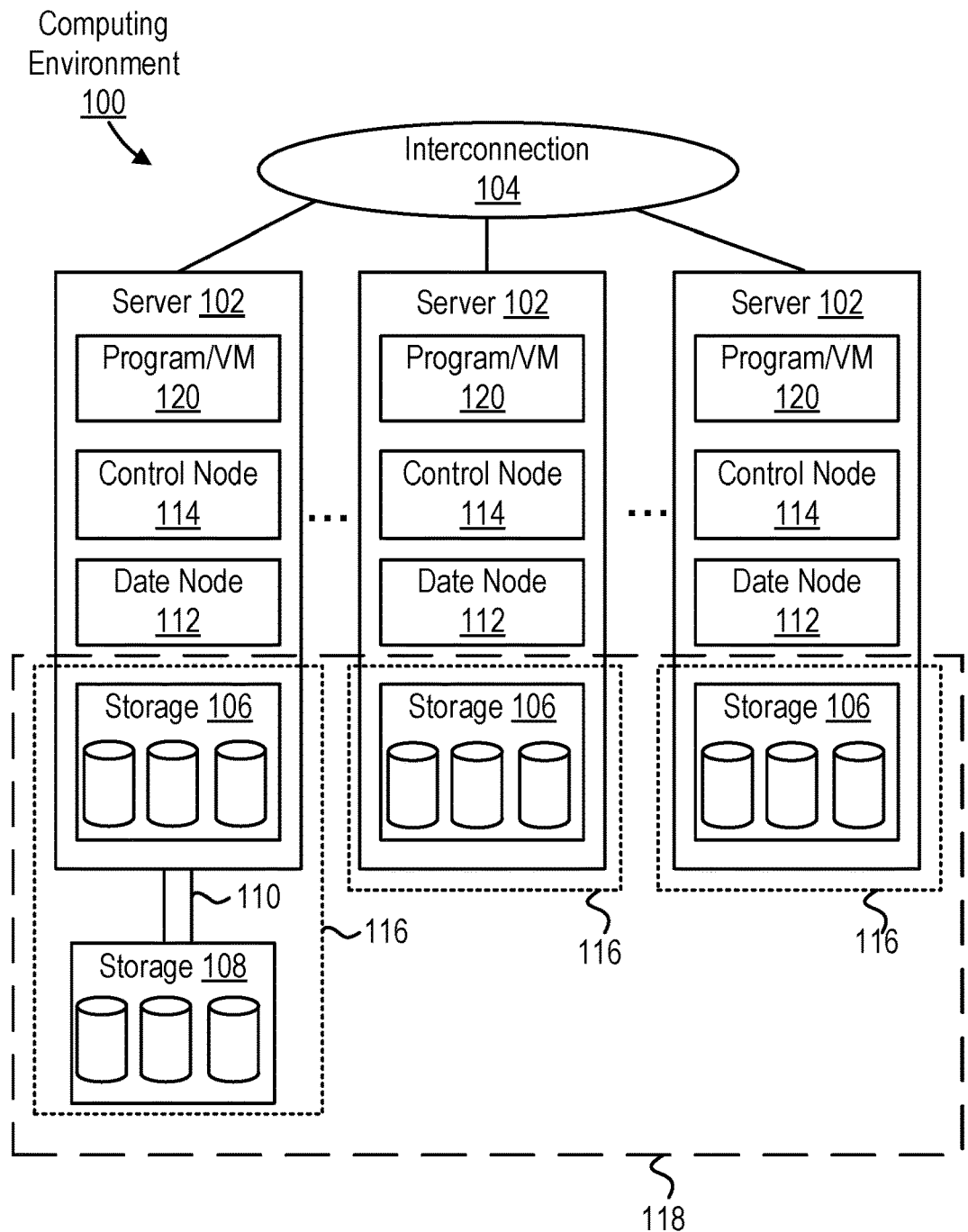
FIG. 1 is a simplified illustration of a computing environment in accordance with an embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

The disclosed embodiments include a system, method, and non-transitory computer-readable storage medium for detecting and/or correcting errors (e.g., data corruption) in a distributed data storage system. The computing environment includes a plurality of servers each having a locally accessible storage pool that contributes to the global storage pool available to the servers. The disclosed embodiments enable the detection and/or correction of errors while reducing the amount of duplicate scrubbing of a single data block.

As used herein, a data scrubbing is a process for detecting and correcting corrupt or inaccurate data blocks in a file system. Files are stored in the file system in blocks of data. Conventionally, data is read or written a whole block at a time. During the scrubbing of a file, the blocks associated with the file are read and a determination is made whether any of the read blocks contain errors. If an error is detected, the error may be corrected, if possible.

Reference is now made to FIG. 1, which is a simplified illustration of an embodiment of a computing environment 100. As seen in FIG. 1, the computing environment 100 comprises at least one server 102. The servers 102 may be interconnected via interconnection 104, such as a local area network (LAN) to enable communication among them. A server 102 may include one or more storage devices 106 located within the server 102 and/or one or more storage devices 108 located outside the server 102 and directly attached to the server 102 (i.e., without a network-based connection) via an interconnection 110, such as Serial-Attached Small Computer System Interface (SAS) or Serial Advanced Technology Attachment (SATA). The storage devices 106, 108 can be implemented by any type of storage technology or by a combination of storage technologies. For example, magnetic disk drive technology, solid state drive technology, or a storage system combining multiple storage devices using multiple storage technologies can be used for implementing the storage devices 106, 108. At least one server 102 comprises a 1$^{st}$ instance of a computer program module, illustratively embodied as data node 112. At least one server 102 comprises a 2$^{nd}$ instance of a computer program module, illustratively embodied as control node 114. Each server 102 in the computing environment may be running (a) a data node 112 only or (b) a control node 114 only or (c) both a data node 112 and a control node 114 or (d) neither a data node 112 nor a control node 114. A single computer program module can act as both a data node 112 and a control node 114 at the same time.

In an embodiment, control nodes 114 and data nodes 112 can be implemented as one or more processors (which may also be used by other components of the server 102) and a non-transitory computer-readable storage medium that stores instructions that when executed by the one or more processors carries out the functions attributed to the control nodes 114 and data nodes 112 respectively as described herein.

The data node 112 may manage some or all of the storage devices 106 within its hosting server 102 and some or all of the storage devices 108 attached to its hosting server 102. The aggregation of the managed storage devices is illustratively embodied as a local storage pool 116 which represents storage locally accessible to a given server 102. The control node 114, in cooperation with the other control nodes 114, if more than one control node 114 exists in the computing environment 100, create and manage a single name space and a single global storage pool 118 that is composed of some or all of the local storage pools 116. When an operation requires an action from a control node 114, any control node 114 in any server 102 can be invoked to perform the operation since all control nodes 114 work in cooperation. The global storage pool 118 acts as a data repository for computer programs and virtual machines and stores, for example, file data used by the various computer programs and virtual machines. In addition to being a data repository, global storage pool 118 maintains metadata to manage the data repository and information and statistics about the usage of the various local storage pools 116 for various operations such as read or write operations.

When a file is stored in the global storage pool, one or more images of the file are stored in one or more local storage pools. An image of a file can be stored either in a single local storage pool or across multiple local storage pools.

Servers 102 also store various computer programs and or virtual machines (VM) embodied as a non-transitory computer-readable storage medium storing instructions executable by one or more processors. Each computer program or virtual machine (VM) 120 executing within every server 102 in the computing environment 100 can have access to the entire global storage pool 118 and can create and delete files from it and read and write to any of the files stored in it.

File Dependency Tree

Figure 2A:
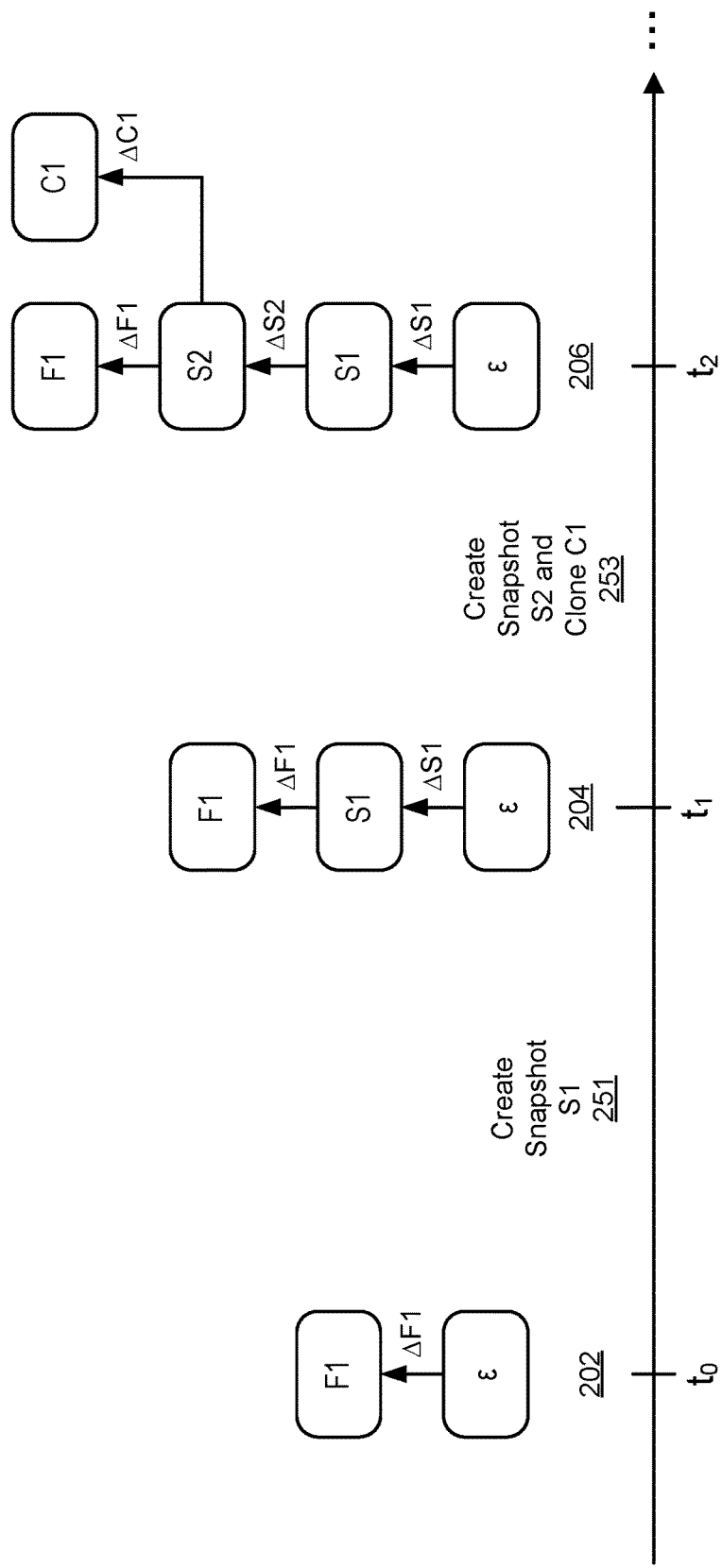
FIG. 2A-2B is an illustration of a dependency tree of an exemplary file that has multiple snapshots and clones.
Figure 2B:
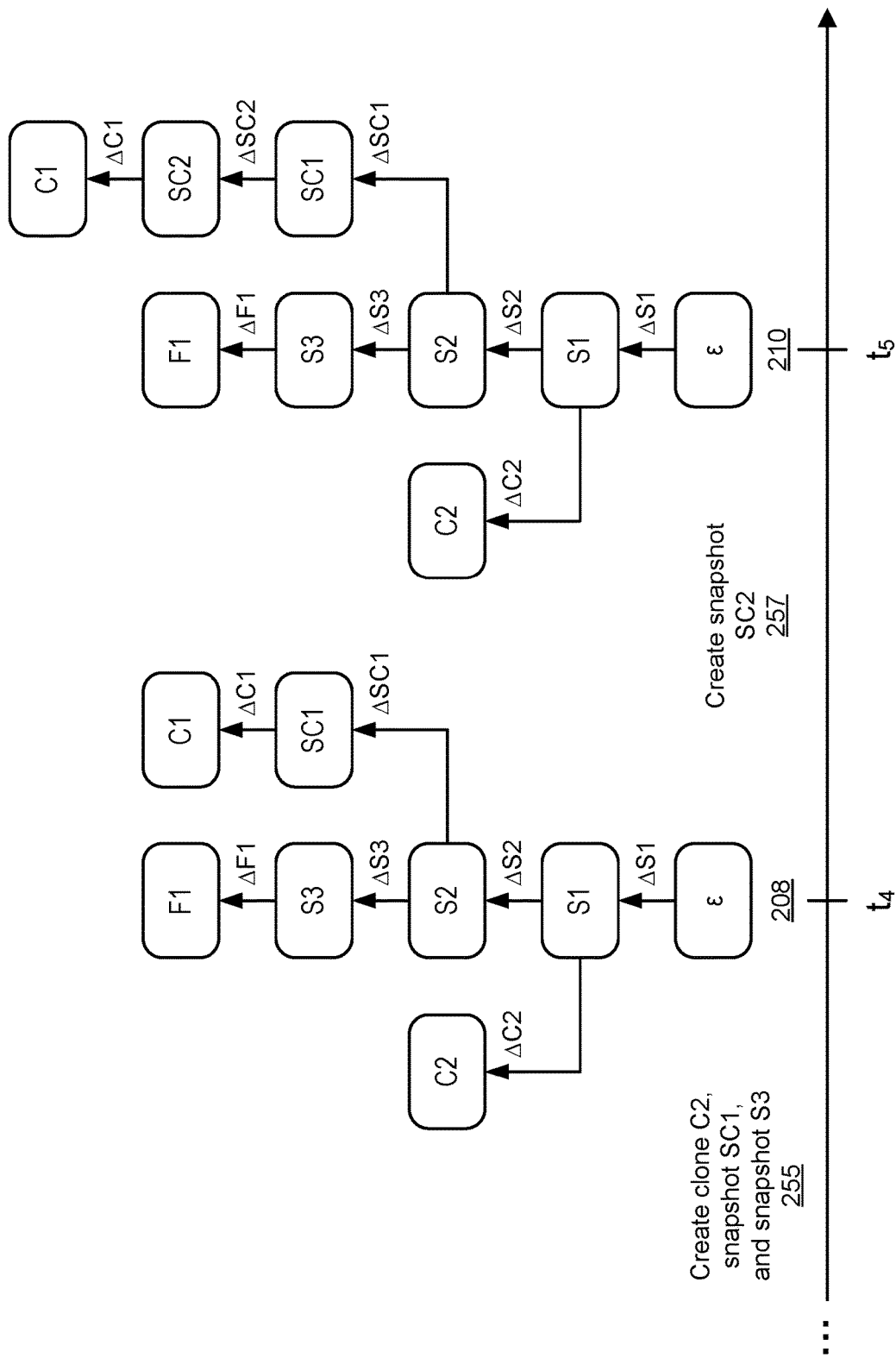

FIG. 2A-2B illustrate the formation of a dependency tree of an exemplary file F1 as file F1 is modified over time and as snapshots and clones of F1 are captured. At time $t_0$, a dependency tree 202 for file F1 includes nodes F1 and ε, connected by edge ΔF1. As used herein, ε is vertex representing an empty file. Edge ΔF1 represents all the blocks of F1 that are different from ε. Since ε is an empty file, ΔF1 represents all the block of F1.

A server 102 creates 251 a snapshot S1 for file F1 between time $t_0$ and $t_1$. The snapshot S1 represents a copy of the file F1 at a particular time point when the snapshot is taken. While the file F1 may continue to be modified over time, the snapshot S1 is generally read-only and therefore remains constant (i.e., frozen in time) once captured. Following creation of the snapshot S1 the dependency tree 204 at time $t_2$ incorporates S1 in between F1 and ε. The dependency tree 204 also includes edge ΔS1 connecting ε and S1 and edge ΔF1 connecting S1 and F1. ΔS1 represents the blocks of S1 that are different from the blocks of ε and ΔF1 represents the blocks of F1 that are different from the blocks of S1 (e.g., due to changes in the file F1 that occur after the snapshot S1 is created).

Between time $t_1$ and time $t_2$, a server 102 creates 253 a second snapshot S2 and concurrently creates a clone C1 as copies of the file F1 (or alternatively, creates clone C1 from the snapshot S2). Unlike a snapshot, the clone C1 is a read/write copy and can therefore be modified after its creation. Thus, at time $t_2$, after creation of the second snapshot S2 and the clone C1 (which may have undergone modification since its creation), the dependency tree 206 the dependency tree incorporates S2 in between F1 and S1. In this dependency tree 206, edge ΔS2 represents the blocks of data of F1 that were modified between the creation of snapshot S1 and the creation of snapshot S2 and edge ΔF1 represents the blocks of data of F1 that were modified after the creation of snapshot S2. Additionally, a new branch in the dependency tree represents the clone C1. Edge ΔC1 represents the blocks of data of C1 that were modified since the creation of clone C1.

Between time $t_3$ and time $t_4$, a server creates 255 a second clone C2 as a read/write copy of snapshot S1, a snapshot SC1 for clone C1, and a snapshot S3 for file F1. As such, the dependency tree 208 at time $t_4$ includes a new branch for clone C2, snapshot SC1 between C1 and S2, and a snapshot S3 between file F1 and snapshot S2. Additionally, edge ΔSC1 represents the blocks that were modified for clone C1 between snapshot S2 and the creation of snapshot SC1, edge ΔC1 represents the blocks that were modified in clone C1 since the creation of snapshot SC1, edge ΔC2 represents the blocks that were modified for clone C2 since its creation from snapshot S1, edge ΔS3 represents the blocks that were modified for file F1 between the creation of snapshot S2 and the creation of snapshot S3, and edge ΔF1 identifies the blocks that were modified for file F1 since the creation of snapshot S3.

Between time $t_4$ and $t_5$, a server 102 creates a snapshot SC2 for clone C1. As such, the dependency tree 210 at time $t_5$ includes node SC2 between snapshot SC1 and clone C1.

Additionally, edge ΔSC2 represents the blocks that were modified for clone C1 between the creation of snapshots SC2 and SC1, and edge ΔC1 identifies the blocks of data that were modified for clone C1 after the creation of snapshot SC2.

Figure 3:
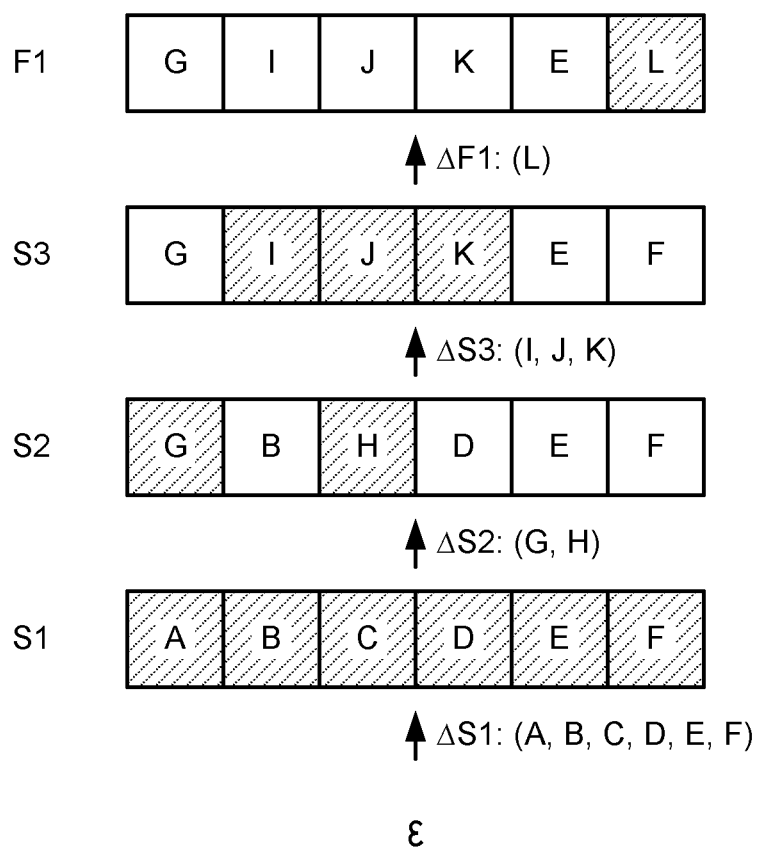
FIG. 3 is a simplified illustration of the data blocks in an exemplary file, in accordance with an embodiment.

FIG. 3 is a simplified illustration of the data blocks of file F1 and the snapshots S1, S2, S3 of file F1, in accordance with an embodiment. Snapshot S1 includes data blocks A, B, C, D, E, and F. Since snapshot S1 is the first snapshot of file F1, ΔS1 identifies all the data blocks of file S1 (that is, all the data blocks of file F1 when snapshot S1 was created). Thus, ΔS1 identifies data blocks A, B, C, D, E, and F.

When the server 102 creates snapshot S2, it replaces data block A with data block G and replaces data block C with data block H. As such, snapshot S2 includes data blocks G, B, H, D, E, and F, and ΔS2 only identifies data blocks G and H. Since the server 102 did not modify data blocks B, D, E, and F between the creation of snapshot S and snapshot S2, ΔS2 does not include blocks B, D, E, or F.

Similarly, when the server 102 creates snapshot S3, it replaces data block B with data block I, data block H with data block J, and data block D with data block K. As such, snapshot S3 includes data blocks G, I, J, K, E, and F, and ΔS3 identifies data blocks I, J, and K. Furthermore, since the server 102 did not modify data blocks G, E, and F between the creation of snapshot S2 and snapshot S3, ΔS3 does not include G, E, or F.

After the creation of snapshot S3, the server 102 subsequently modifies the file F1 to replace data block F with data block L. As such, file F1 includes data blocks G, I, J, K, E, and L. Since only data block L is different than the data blocks of snapshot S3, ΔF1 only identifies data block L.

Figure 4:
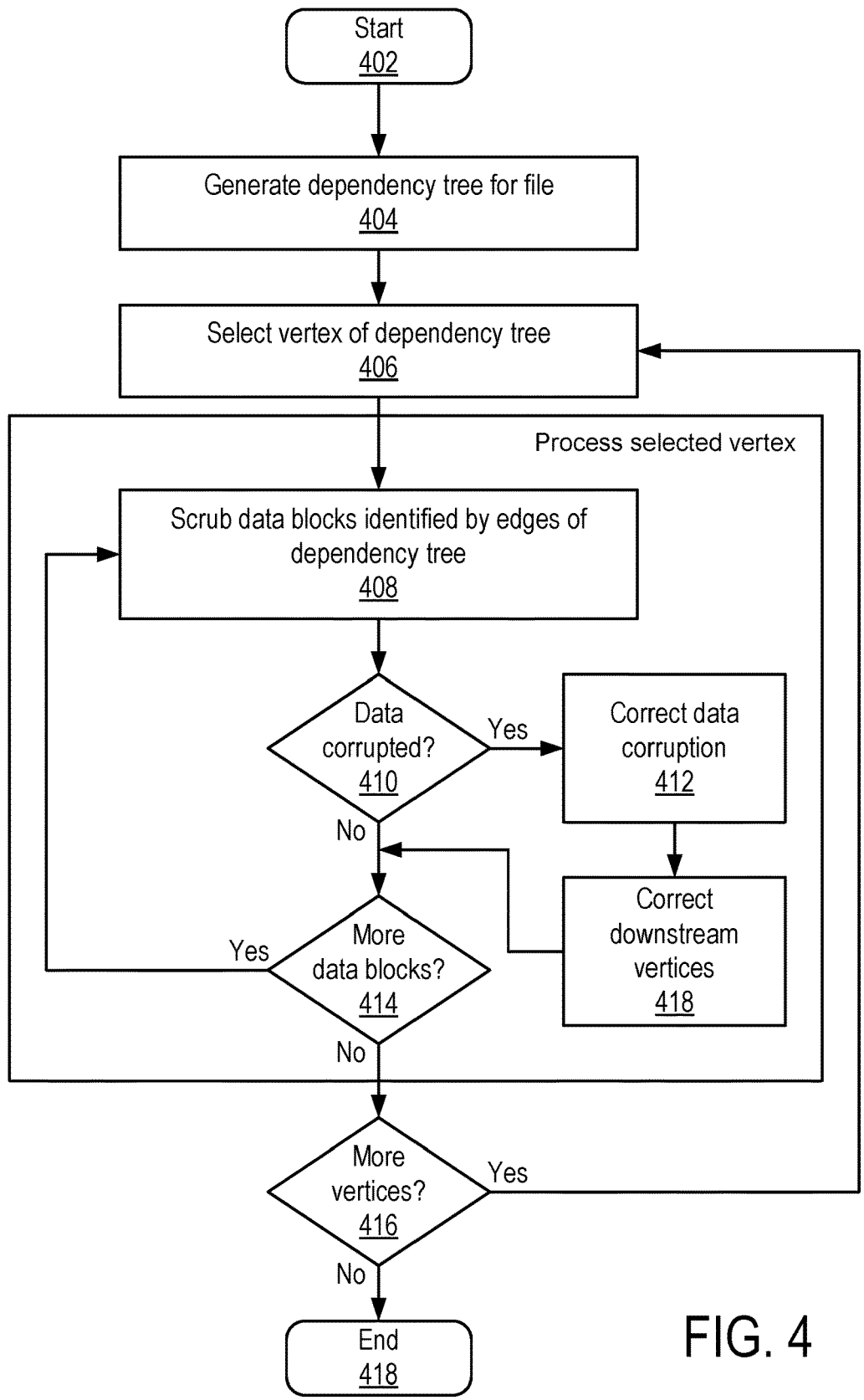
FIG. 4 is an illustration of a flow diagram of a process for detecting errors in a file, according to one embodiment.

FIG. 4 is an illustration of a flow diagram of a process for detecting errors in a file, according to one embodiment. The process starts at step 402. A dependency tree, such as the one depicted in FIG. 2 is generated 404 for a file. In some embodiments, the dependency tree for a file is created when the file is created, and the dependency tree is updated every time a snapshot or a clone is created, or data is written for the file or any clone of the file. Periodically, an error checking process is initiated to determine if the file contains errors. During this process, the dependency tree is traversed to determine if any of the data blocks associated with the file, a snapshot of the file or a clone of the file is corrupted. To traverse the dependency tree, a vertex of the tree is selected 406 and processed. After the selected vertex has been process, a next vertex is selected 406 and processed. This process is repeated until all the vertices in the dependency tree have been processed. In some embodiments, the dependency tree is traversed breadth first. That is, the traversal of the dependency tree starts at the root vertex (e.g., ε) and processes the neighboring vertices (i.e., vertices connected to the root vertex by an edge) before moving to the next level. After the vertices that are connected to the root vertex (level 1 vertices) have been processed, the vertices that are connected to the level 1 vertices are processed. In another embodiment, the dependency tree is traversed depth first. That is, each vertex of a branch of the dependency tree is processed before backtracking. In a depth first traversal, the tree is traversed one branch at a time, from the root of the branch to the leaf vertices of the branch before starting the traversal of a next branch.

For instance, in the exemplary dependency tree 210 of FIG. 2B, snapshot S1, which is connected to the root ε is processed first. After snapshot S1 has been processed, the vertices connected to snapshot S1 are processed. As such, after snapshot S1 has been processed, clone C2 and snapshot S2 are processed. Similarly, after clone C2 and snapshot S1 has been processed, snapshots S3 and SC1 are processed. This is repeated until all the leaf vertices (i.e., F1, C1, and C2) are processed.

When processing a vertex during the traversal of the dependency tree, the server 102 scrubs 408 the data blocks identified by the edge that leads to the vertex being processed. For instance, in the dependency tree associated with the data blocks of FIG. 3, when processing the vertex corresponding to snapshot S1, the data blocks identified by edge ΔS1, i.e., data blocks A, B, C, D, E, and F, are scrubbed. When the vertex corresponding to snapshot S2 is processed, the data blocks identified by edge ΔS2, i.e., data blocks G and H, are scrubbed. As such, data blocks B, D, E, and F are not scrubbed when the vertex corresponding to snapshot S2 is processed, thus, reducing the number of duplicate scrubbings of data blocks.

During the scrubbing of a data block, the checksum of the data block is computed. The computed checksum is then compared to a stored checksum previously computed for the data block. If the computed checksum is different than the stored checksum, a determination is made that the data block contains an error. In some embodiments, a checksum for the stored checksum is also computed and stored to determine if the stored checksum contains an error.

If a data corruption (e.g., an error in the scrubbed data block) is found 410 during the scrubbing of a data block, the data corruption may be corrected 412. In some embodiments, the data corruptions are flagged if they cannot be corrected. In other embodiments, if data is determined to be corrupted, the uncorrupted data may be obtained from a node containing a replica of the corrupted data. For instance, the uncorrupted may be obtained from an external replica of the affected data block.

In addition, if data stored in a data block is determined to be corrupted, the data associated with vertices in a sub-tree starting at the affected vertex (i.e., downstream vertices) may also be corrupted. That is, data from vertices that are located after the affected vertex in the dependency tree may also include corrupted data, although this is not necessarily the case. For example, in the dependency tree of FIG. 3, if data block C of snapshot S1 is corrupted, data blocks H and J may also be corrupted if creating data blocks H and J involve reading corrupted data from C, since the corruption may have propagated when snapshots S2 and S3 were created. As such, when correcting the corrupted data for the affected vertex, data for the vertices of the sub-tree starting at the affected vertex may also be corrected 418. In one embodiment, if a data block is corrupted when a snapshot is being created, the data block is fixed prior to creating the snapshot. As such, data corruptions from one snapshot may not propagate to subsequent snapshots.

After a data block has been scrubbed and/or errors have been corrected, another data block identified by the edge that leads to the vertex being processed is scrubbed. This process is repeated for every data block identified by the edge that leads to the vertex being processed.

After all the data blocks identified by the edge that leads to the vertex being processed have been scrubbed, a next vertex is processed. This process is repeated until all vertices of the dependency tree have been processed.

Figure 5B:
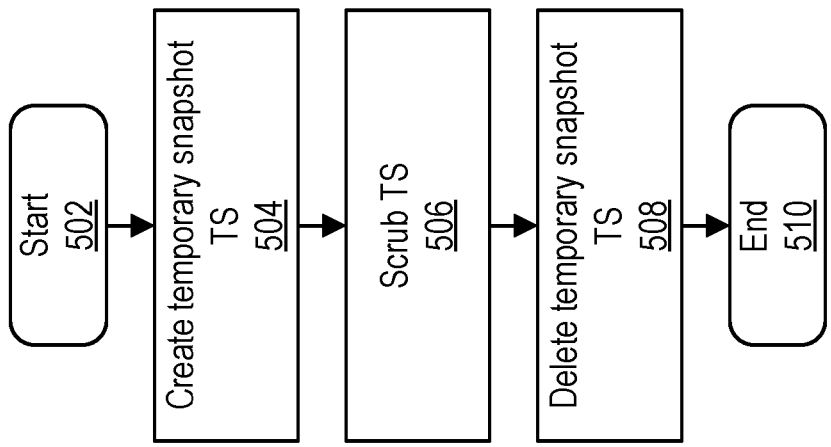
FIG. 5B is an illustration of a flow diagram for processing a leaf node, in accordance with an embodiment.
Figure 5A:
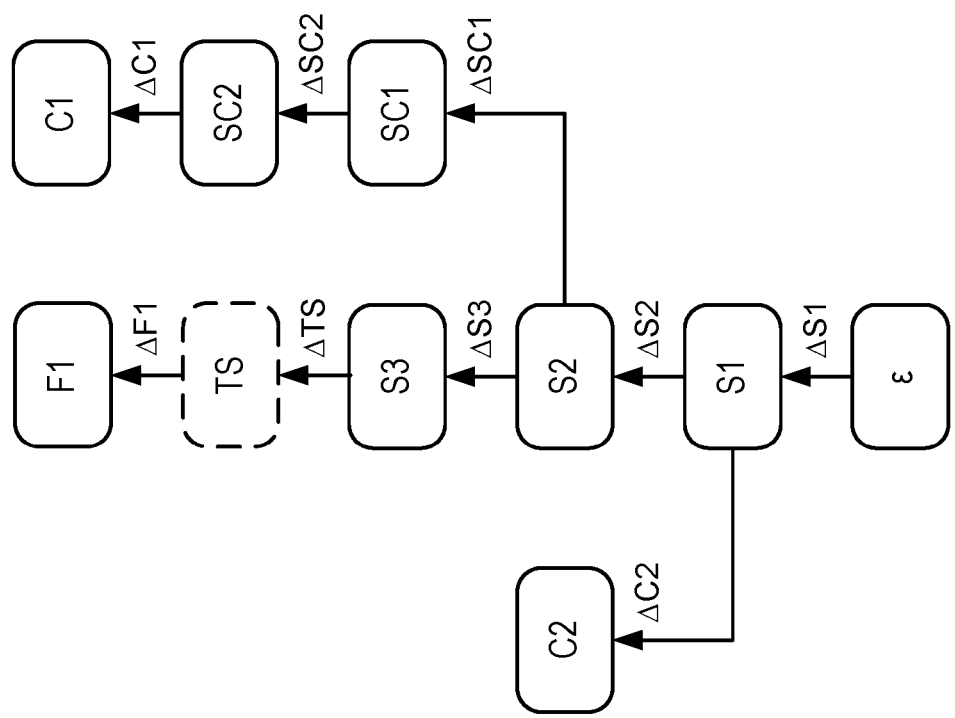
FIG. 5A is an exemplary dependency tree for an exemplary file during the processing of a leaf node, in accordance with an embodiment.

FIG. 5A is an exemplary dependency tree for an exemplary file during the processing of a leaf node, and FIG. 5B is an illustration of a flow diagram for processing a leaf node, in accordance with an embodiment. In the example of FIG. 5A, leaf node F1 is being processed to check for corrupt data. The process starts at step 502. A temporary snapshot TS is created 504 for the node leaf being processed. As such, a vertex corresponding to snapshot TS is inserted between the vertices corresponding to snapshot S3 and file F1. Edge ΔTS identifies the data blocks that have been modified for file F1 between the time snapshot S3 and snapshot TS were created, and edge ΔF1 identifies the data blocks that were modified since the creation of snapshot TS.

The data blocks identified by edge ΔTS are scrubbed 506. Since a temporary snapshot was created for the processing of leaf vertex corresponding to file F1, file F1 can still be modified during the scrubbing process. The data blocks that were modified after the temporary snapshot, i.e., the data blocks identified by ΔF1, are not scrubbed during the current scrubbing round, and instead, they are scrubbed starting the next scrubbing round. After temporary snapshot TS is processed, the temporary snapshot is deleted 508.

Upon reading this disclosure, those of skill in the art will appreciate still additional alternative embodiments having the features described herein. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the scope of the invention defined in the appended claims.

What is claimed is:

1. A computer-implemented method for detecting data corruption in a distributed data storage system, the method comprising:

storing to a storage device, a file and a sequence of snapshots of the file, the sequence of snapshots of the file comprising sequentially captured copies of earlier states of the file, wherein the file was modified subsequent to capturing of each of the sequence of snapshots;

storing, by a storage server, a dependency tree for the file, the dependency tree including a plurality of nodes, each node representing a snapshot, wherein a node of a given snapshot is connected by an edge to a node of a previous snapshot in the sequence of snapshots, the edge indicating data blocks of the given snapshot that are different from data blocks of the previous snapshot in the sequence of snapshots;

beginning with an earliest snapshot in the sequence of snapshots, sequentially scrubbing the sequence of snapshots, wherein scrubbing a given snapshot comprises scrubbing each of the data blocks of a given snapshot, the data blocks identified by an edge in the dependency tree connecting the given snapshot to a previous snapshot as being different than the data blocks of the previous snapshot in the sequence of snapshots;

responsive to detecting a corrupt data block, determining based on the dependency tree, which later snapshots include the corrupt data block; and correcting the corrupt data block.

2. The computer-implemented method of claim 1, wherein the snapshots are read-only copies of the file.

3. The computer-implemented method of claim 1, wherein the dependency tree is traversed breadth first.

4. The computer-implemented method of claim 1, further comprising:

responsive to a new snapshot being created for the file, updating the dependency tree, comprising:

storing, in association with the new snapshot, an indication of the data blocks that are different between the file and a previous snapshot in the sequence of snapshots; and storing, in association with the file, an indication of the data blocks that are different between the file and the new snapshot.

5. The computer-implemented method of claim 4, wherein the stored indication of the data blocks that are different between the file and the new snapshot identifies data blocks for the file modified after the new snapshot was created.

6. The computer-implemented method of claim 1, further comprising:

storing to the storage device, clones of the file, the clones comprising captured copies of the file, wherein the clones comprise read/write copies, wherein the dependency tree further indicates, for each of the clones, data blocks that are different between the clone and a previous snapshot in the sequence of snapshots; and scrubbing the clones, wherein scrubbing the clones comprises scrubbing each of the data blocks identified in the dependency tree as being different than the data blocks of a previous snapshot in the sequence of snapshots; and responsive to detecting a corrupt data block in a clone, correcting the corrupt data block.

7. The computer-implemented method of claim 6, further comprising:

responsive to a new clone being created for the file, updating the dependency tree, comprising:

storing, in association with the new clone, an indication of the data blocks that are different between the new clone and a previous snapshot in the sequence of snapshots.

8. The computer-implemented method of claim 1, wherein scrubbing a data block comprises:

reading the data block from the distributed data storage system;

calculating a checksum for the data block; and determining whether a data stored in the data block is corrupted based on the calculated checksum.

9. The computer-implemented method of claim 8, further comprising:

responsive to determining that the data stored in the data block is corrupted, correcting the data stored in the data block.

10. The computer-implemented method of claim 9, wherein correcting the data stored in the data block comprises:

receiving a copy of the data stored in the corrupted data block; and replacing the data stored in the corrupted data block by the copy.

11. The computer-implemented method of claim 1, further comprising:

creating a temporary snapshot for the file, creating the temporary snapshot comprising:

storing, in association with the temporary snapshot, an indication of the data blocks that are different between the file and a previous snapshot in the sequence of snapshots; and storing, in association with the file, an indication of the data blocks that are different between the file and the temporary snapshot;

scrubbing the temporary snapshot; and deleting the temporary snapshot.

12. The method of claim 1, wherein the dependency tree includes a plurality of vertices, each vertex of the plurality of vertices corresponding to a snapshot of the file, each vertex of the plurality of vertices connected to another vertex via an edge, an edge identifying data blocks that are not in common between vertices connected by the edge.

13. A non-transitory computer readable storage medium storing instructions for detecting data corruption in a distributed data storage system, the instructions when executed by a processor cause the processor to:
  store to a storage device, a file and a sequence of snapshots of the file, the sequence of snapshots of the file comprising sequentially captured copies of earlier states of the file, wherein the file was modified subsequent to capturing of each of the sequence of snapshots;
  store a dependency tree for the file, the dependency tree including a plurality of nodes, each node representing a snapshot, wherein a node of a given snapshot is connected by an edge to a node of a previous snapshot in the sequence of snapshots, the edge indicating data blocks of the given snapshot that are different from data blocks of the previous snapshot in the sequence of snapshots;
  beginning with an earliest snapshot in the sequence of snapshots, sequentially scrub the sequence of snapshots, wherein scrubbing a given snapshot comprises scrubbing each of the data blocks of a given snapshot, the data blocks identified by an edge in the dependency tree connecting the given snapshot to a previous snapshot as being different than the data blocks of the previous snapshot in the sequence of snapshots;
  responsive to detecting a corrupt data block, determine based on the dependency tree, which later snapshots include the corrupt data block; and
  correct the corrupt data block in each of the snapshots determined to include the corrupt data block.

14. The non-transitory computer readable storage medium of claim 13, wherein the dependency tree is traversed breadth first.

15. The non-transitory computer readable storage medium of claim 13, wherein the instructions further cause the processor to:
  responsive to a new snapshot being created for the file, update the dependency tree, comprising:
    store, in association with the new snapshot, an indication of the data blocks that are different between the file and a previous snapshot in the sequence of snapshots; and
    store, in association with the file, an indication of the data blocks that are different between the file and the new snapshot.

16. The non-transitory computer readable storage medium of claim 15, wherein stored indication of the data blocks that are different between the file and the new snapshot identifies data blocks for the file modified after the new snapshot was created.

17. The non-transitory computer readable storage medium of claim 13, wherein instructions for scrubbing a data block cause the processor to:
  read the data block from the distributed data storage system;
  calculate a checksum for the data block; and
  determine whether a data stored in the data block is corrupted based on the calculated checksum.

18. The non-transitory computer readable storage medium of claim 17, wherein the instructions further cause the processor to:
  responsive to determining that the data stored in the data block is corrupted, correct the data stored in the data block.

19. The non-transitory computer readable storage medium of claim 18, wherein the instructions for correcting the data stored in the data block cause the processor to:
  receive a copy of the data stored in the corrupted data block; and
  replace the data stored in the corrupted data block by the copy.

20. The non-transitory computer readable storage medium of claim 13, wherein the instructions further cause the processor to:
  create a temporary snapshot for the file, creating the temporary snapshot comprising:
    storing, in association with the temporary snapshot, an indication of the data blocks that are different between the file and a previous snapshot in the sequence of snapshots; and
    storing, in association with the file, an indication of the data blocks that are different between the file and the temporary snapshot;
  scrub the temporary snapshot; and
  delete the temporary snapshot.

* * * * *